July 10, 1962 E. D. WYNN ET AL 3,042,954
WINDOW OR WINDSCREEN WIPER MECHANISMS
Filed Jan. 13, 1960 3 Sheets-Sheet 1
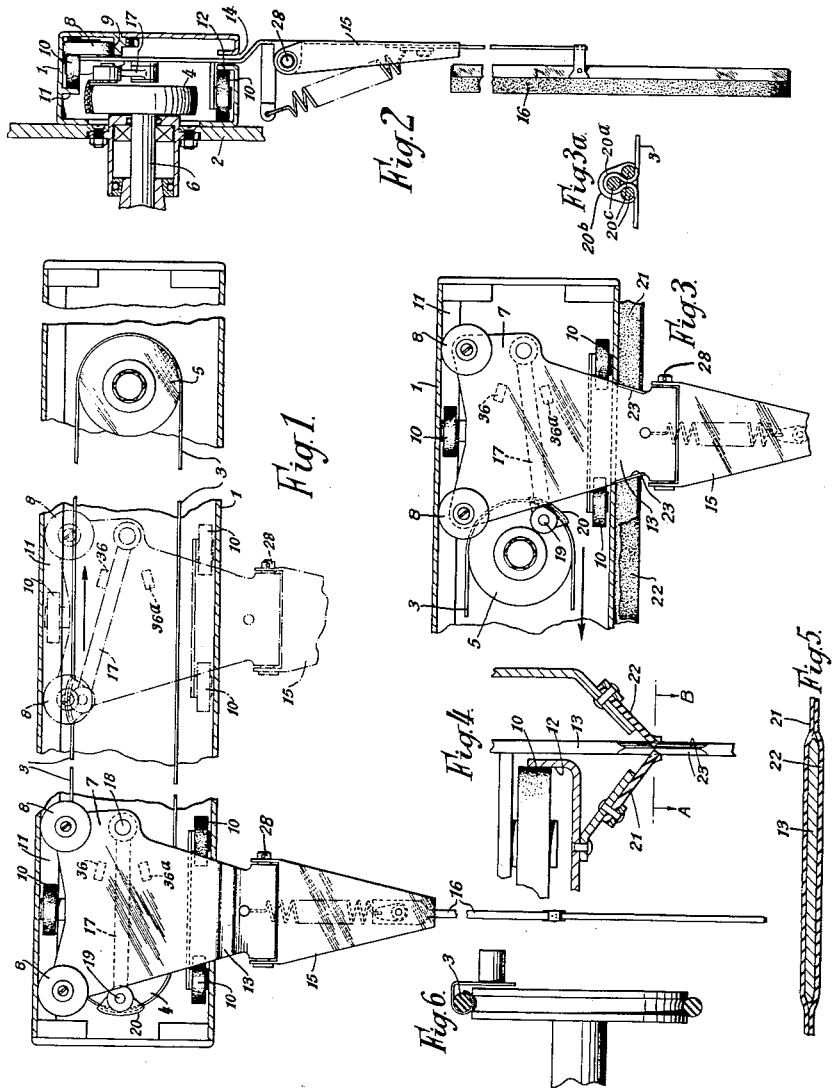
INVENTORS
Charles G. Longford
BY Edward D. Wynn
Stevens, Davis, Miller & Mosher
ATTORNEYS

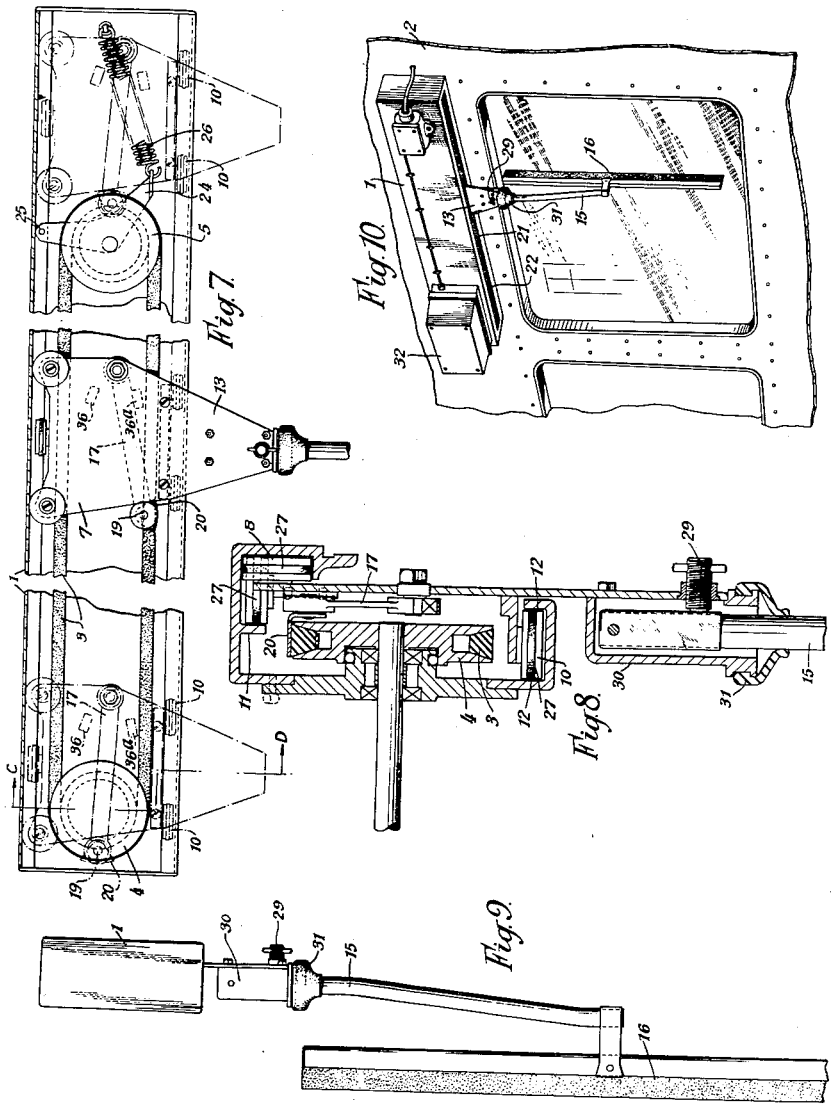

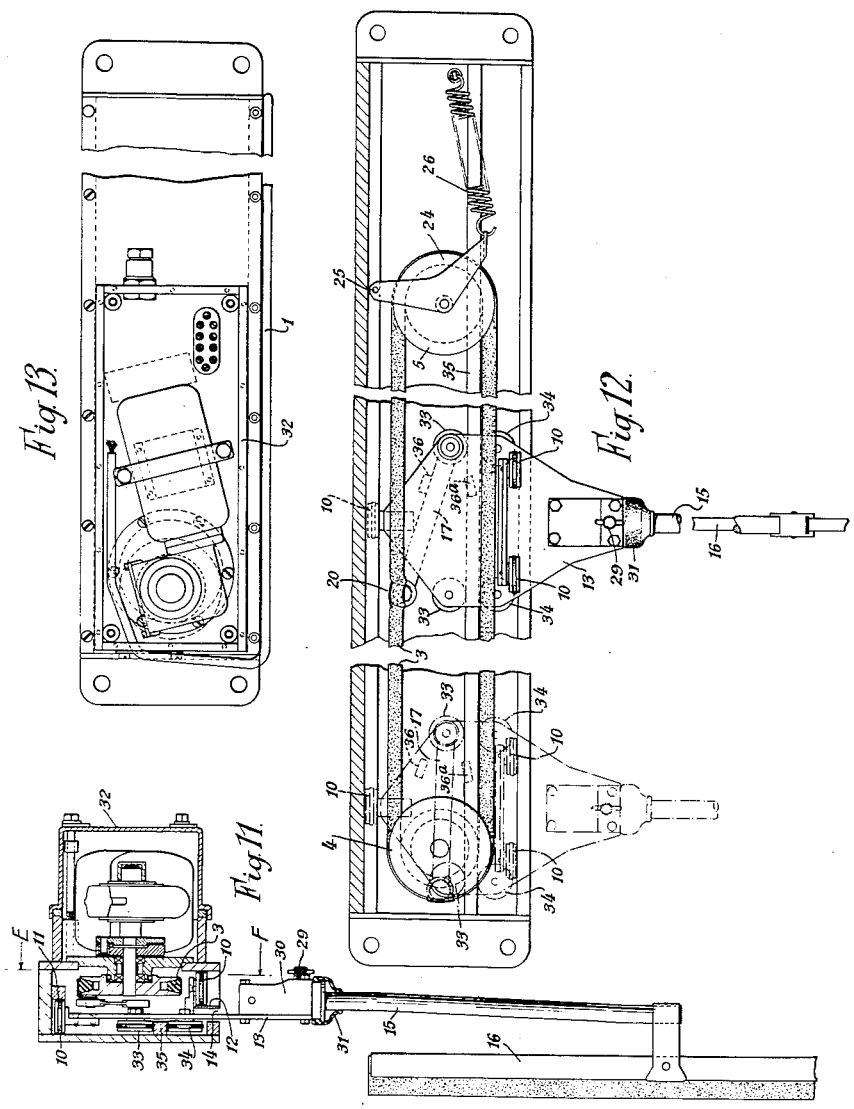

United States Patent Office 3,042,954
Patented July 10, 1962

3,042,954
WINDOW OR WINDSCREEN WIPER MECHANISMS
Edward Donald Wynn, Cheltenham, and Charles Geoffrey Longford, Quedgeley, England, assignors to Wynn Developments Limited, Cheltenham, England
Filed Jan. 13, 1960, Ser. No. 2,276
Claims priority, application Great Britain Jan. 14, 1959
5 Claims. (Cl. 15—250.24)

The wiper mechanism forming the subject of the present invention, although suitable for use generally on locomotive or other vehicles or aircraft, is particularly intended for marine use on ships where the mechanism necessarily has to operate under very difficult conditions. In this connection it will be appreciated that in rough weather the wiper mechanism will be almost continuously subjected to spray causing the deposition of large quantities of salt over the window or screen being wiped and the wiper itself, whilst the salt content of the water quickly sets up corrosion in any exposed metal parts. It will be appreciated, therefore, the desirability of so constructing the mechanism that it will be protected from the action of sea water and will be capable of operating satisfactorily under very difficult conditions such as are often experienced particularly during rough weather and under conditions of low temperature resulting in ice formation over any exposed parts of the mechanism.

It is very desirable from the point of view of obtaining maximum visibility for the wiper to operate over the largest possible area of the window or windscreen and it is proposed, therefore, in the construction forming the subject of the present application, that the wiper blade or blades shall have a straight line motion across the window or screen from side to side, such an arrangement having many advantages over the pendulum type wiper which only sweeps clear a segment shaped part of the glass or screen, whereas with a wiper having a straight line motion, the wiper blade or blades may be so arranged that all or substantially all the area of the window or screen can be kept clear.

In the case of a wiper having a straight line motion, however, it is not really practicable to arrange the operating mechanism internally of the window or windscreen in the case of naval craft where it is necessary for the ship to be capable of being sealed in an emergency against atomic fall-out in the event of a nuclear war. It will be appreciated therefore that in the case of a straight line motion window wiper the mechanism must necessarily be adequately protected both from the elements and also from any possibility of freezing up under low temperature conditions.

The chief object of the invention therefore is to evolve a straight line motion wiper mechanism which will operate satisfactorily under all conditions, will be of simple construction and can be easily maintained during use.

It is proposed in carrying out the invention to operate the wiper through the medium of an endless belt, chain or other flexible member passing over suitable pulleys or sprocket wheels and to drive the belt, chain or the like by means of an electric motor or other operating mechanism connected with a driving pulley or driving sprocket by means of a suitable reduction gear which may take the form of a gear box or alternatively a number, for example two, pulleys or sprocket wheels of different diameter carrying a belt or chain.

According to one feature of the present invention the wiper blade or blades is or are carried by a carriage which is slidably associated with one or more guides whereby it can be given a transverse straight line sliding motion, the carriage having a permanent connection with the endless belt, chain or other flexible driving member.

According to a further feature of the invention the carriage is connected with the belt or the like by means of a hinged link which is permitted a certain amount of pivotal movement in relation to the carriage, but at one end of travel of the carriage engages a suitable stop when the link is acting in compression as distinct from tension, thereby preventing any distortion of the belt or the like out of its normal straight line position during the return run. It will be appreciated that with this arrangement the carriage and its associated wiper blade or blades will have a continuous to and fro straight line motion over the surface of the window or screen.

According to a further feature of the invention an arm carrying the blade or blades projects downwardly between two rubber or like sealing strips or members which normally maintain contact with one another but open automatically as a result of passage of the arm therebetween thereby providing a good seal to prevent ingress of water into the interior of the wiper operating mechanism.

According to a still further feature of the invention the arm carrying the blade or blades has a covering of polytetrafluorethylene where it passes between the members of the seal with the object of preventing wear both of the arm and of the sealing members.

According to a still further feature of the invention the guides are insulated from the casing and carriage and are used for the delivery of electric current to the wiper arm to heat the latter for de-icing purposes, the electric current being picked up by suitable brushes carried by the carriage and engaging the guides.

Referring to the accompanying drawings:
FIGURE 1 is a sectional front elevation of one form of windscreen wiper mechanism in accordance with the invention partly in section.
FIGURE 2 is a vertical section of same.
FIGURE 3 is a fragmentary longitudinal vertical section illustrating a seal for the blade carrying arm.
FIGURE 3a is a fragmentary section illustrating an alternative method of connecting the link to a flat belt.
FIGURE 4 is a fragmentary transverse section of the seal on an enlarged scale.
FIGURE 5 is a section on the line A—B in FIGURE 4.
FIGURE 6 is a fragmentary section showing an alternative form of driving belt.
FIGURE 7 is a view similar to FIGURE 1 but illustrating a modified construction.
FIGURE 8 is a vertical section on an enlarged scale on the line C—D in FIGURE 7.
FIGURE 9 is an end elevation.
FIGURE 10 is a perspective view of the further modified construction shown in FIGURES 11-13.
FIGURE 11 is a vertical section of this further modified form.
FIGURE 12 is a section on the line E—F in FIGURE 11.
FIGURE 13 is a view showing the positioning of the driving motor.

Referring in the first case to the construction shown in FIGURES 1-5 the mechanism includes a casing 1 which is intended to be mounted exteriorly of the window or windscreen, which is to be wiped, somewhat in the manner shown in FIGURE 10 and upon a suitable support 2.

The casing 1 contains an endless belt 3 which passes over pulleys 4 and 5, pulley 4 being connected to a shaft 6 driven for example by means of an electric motor and reduction gearing (not shown).

The casing also contains a carriage in the form of a plate 7 carried by a pair of spaced rollers 8 running between horizontal guides 9 and the underside of the top of the casing, the plate 7 carrying three rollers 10 running between vertical guides 11 and 12 situated at the upper and lower ends of the casing.

The plate 7 depends downwardly as an arm 13 which projects from the casing through a longitudinal slot 14 and carries the usual hinged arm 15, which in turn supports a wiper blade 16.

The plate 7 and its associated wiper blade is given a true to and fro rectilinear motion by a link 17 hinged at 18 to the plate 7 and hinged at 19 to a clip or belt pad 20 permanently connected to the belt and of arcuate shape so that it will pass easily over the pulleys 4 and 5. It will be appreciated that during the travel of the carriage in one direction the link 17 will be in tension and during the return movement in compression.

It will be appreciated that when the carriage reaches the end of its travel in the one direction, the link will lie diametrally of the belt pulley as in FIGURE 1 and further movement of the belt will subject the link to compression to move the carriage in the opposite direction, the direction of travel of the belt being indicated by the arrow, the carriage being shown in an intermediate position by chain dotted lines. In FIGURE 3 the carriage has reached the opposite end of its run and is in process of reversing.

The position of hinge point 19 is such that when passing around the pulley, it is situated on a smaller radius from the pulley centre than the radius of the pitch line of the belt. It is found that a value 80% of the pitch line radius of the belt gives lowest values of deceleration and acceleration of the carriage at both ends of its travel and hence the smoothest operation.

To prevent any possible upward displacement of the belt when the link is operating in compression, the carriage may be fitted with a suitable stop 36 which is engaged by the link to limit pivotal movement of the link in an upward direction.

As in some cases it may be desired to reverse the driving motor and consequently the direction of travel of the belt an additional stop 36a may be provided.

In FIGURES 1–4 a flat belt is shown which is preferably composed of nylon and suitably tensioned. Instead of using a belt pad 20 of arcuate shape the belt may be formed with a tuck 20a, the belt being sandwiched between two plates 20b connected by pins 20c, one plate carrying the hinge pin 19 for the link.

In some cases it may be desirable to seal the slot 14 against the ingress of water particularly if the mechanism is inverted and mounted at the lower end of the window or windscreen.

In such a case the slot may take the form shown in FIGURE 4. In this case two rubber or like sealing strips 21 and 22 which are riveted to the casing on opposite sides of the slot. The strips are inwardly and downwardly inclined, strip 22 preferably overlapping the edge of strip 21.

Normally the strips will contact to ensure a good seal but will be separated by the arm as it moves to and fro. The arm is for that reason comparatively thin and is tapered as at 23 at its opposite edges (see FIGURES 3 and 5) to facilitate the parting of the strips and ensure that the strips closely embrace the arm as in FIGURE 5. To prevent or minimise abrasion of the arm and the strips the part of the arm engaged by the strips may have a covering of a suitable plastic material such as polytetrafluorethylene.

Referring now to FIGURES 7–10 the mechanism is generally similar to the previously described construction, but in this case a V belt is used running over V grooved pulleys, pulley 5 constituting a jockey pulley and being carried by a lever 24 pivotally mounted at 25 and connected with a tension spring 26 anchored at its opposite end to the casing, thereby maintaining the belt under tension.

In this case the carriage is supported and guided within the casing in a somewhat similar manner to FIGURES 1–5, the rollers being fitted with rubber tyres 27.

The blade arm 15 is in this case provided with means external to the wiper mechanism for adjusting the pressure of the blade on the glass. The arm 15 is pivotally mounted at 28 and the arm 13 is provided with an adjusting screw 29 bearing on arm 15 to displace the latter as required to increase or decrease the blade pressure. The upper end of arm 15 is enclosed in a casing 30 secured to arm 13, the arm 15 passing through a tubular rubber grommet 31 which ensures a good seal.

Referring now particularly to FIGURE 10 which shows the position of one or other of the wiper mechanisms in accordance with the invention, the casing 1 carries a sub-casing 32 containing an electric driving motor which drives one of the belt pulleys through a suitable reduction gear.

FIGURES 11–13 illustrate a further modified construction wherein the carriage is supported by two pairs of rollers 33 and 34 running on opposite faces of a horizontal guide 35, the carriage carrying three additional rollers 10 arranged substantially as in the previously described constructions.

The casing 1 and other metal components are preferably constructed from a metal which will not be unduly affected by the corrosive action of sea water.

It has been found as a result of experiment that the arrangements of rollers shown in the drawings adequately take care of the lateral and other loads to which they are likely to be subjected when operating under adverse conditions, only radial loads being applied to the bearings of the various rollers. In this connection it will be appreciated that the mechanism has been designed to operate under Arctic conditions where the wiper blade or blades will be called upon to clear ice and snow from the window or windscreen.

We claim:

1. A window wiper mechanism comprising a casing, means mounting said casing horizontally in proximity to a window, guides carried by said casing, a movable carriage, spaced rollers rotatably mounted on said carriage to engage said guides and prevent pivotal movement of said carriage in its plane of movement and also in a plane at right angles to its plane of movement, pulleys rotatably mounted at opposite ends of said casing, a flexible belt encircling said pulleys, an arcuate pad member secured on said belt longitudinally thereof and having a radius approximating that of the pulleys, said pad member substantially conforming with the peripheries of the pulleys when passing around said pulleys, a link pivotally connected to said carriage and to said pad member, a window wiper arm and blade depending downwardly from said carriage and extending below the casing, means for rotating one of said pulleys to drive said belt and impart a to and fro wiper movement to said wiper arm, a first stop carried by the carriage engageable by the link during movement of the carriage in one direction to limit pivotal movement of the link and distortion of the belt when the link is in compression, and a second stop carried by the carriage and engageable by the link during movement of the carriage in the opposite direction to limit pivotal movement of the link and distortion of the belt when the link is in tension.

2. The combination of claim 1, wherein said casing has a bottom wall formed with a longitudinal slot through which the window wiper arm extends, said slot having bounding walls provided with engaging resilient sealing strips which normally are in contact with one another but are progressively moved apart as a result of the passage of the arm therebetween, the strips, when not in contact with one another, engaging opposing sides of the arm to provide a seal to prevent ingress of the water into the casing through the slot.

3. The combination of claim 2, wherein said strips are inclined downwardly and inwardly from the walls of the slot.

4. The combination of claim 2, wherein said arm is beveled at its opposite edges so that as the arm moves lengthwise of the slot it will automatically part the sealing strips, the strips automatically taking up their normal sealing position as the arm passes along the slot.

5. The combination of claim 2, wherein said arm has a covering of polytetrafluorethylene where it passes between the sealing strips so as to prevent wear of the arm and the sealing strips.

References Cited in the file of this patent

UNITED STATES PATENTS

| 1,665,570 | Waters | Apr. 10, 1928 |
| 1,748,055 | Brown et al. | Feb. 25, 1930 |

FOREIGN PATENTS

| 184,461 | Austria | Jan. 25, 1956 |
| 417,940 | Great Britain | Oct. 11, 1934 |
| 609,461 | France | Aug. 16, 1926 |